United States Patent Office

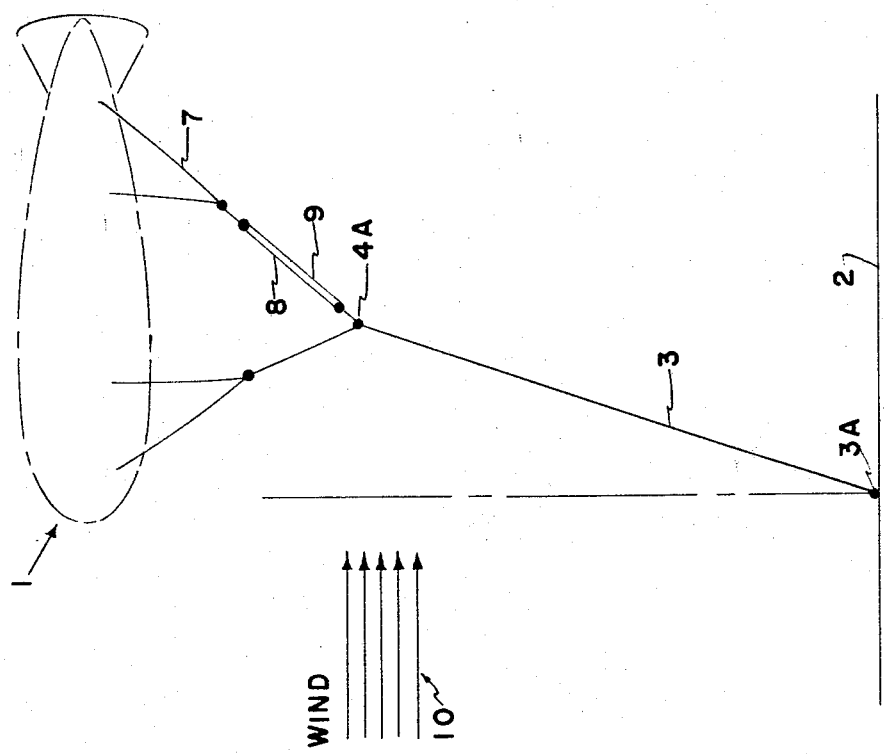
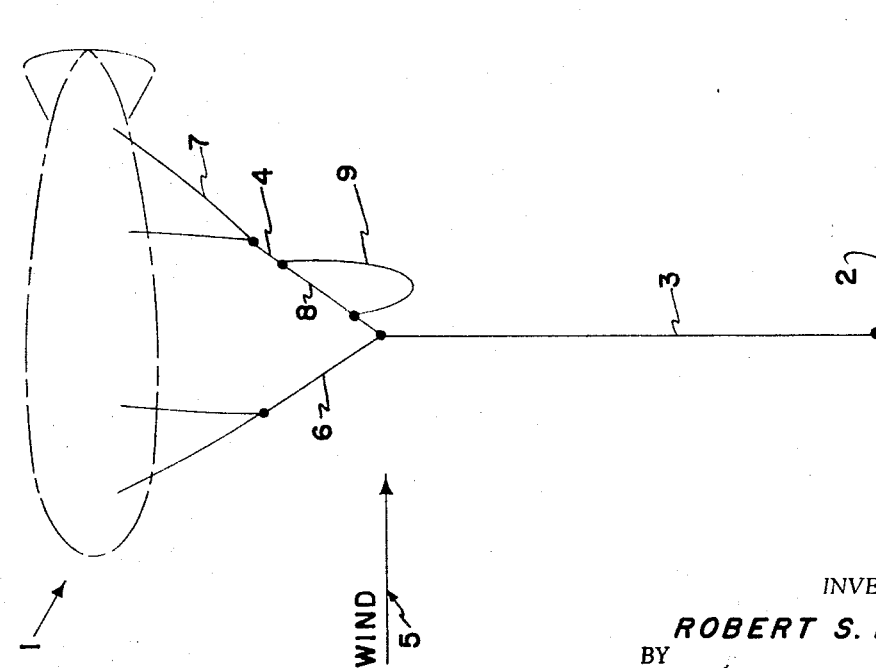

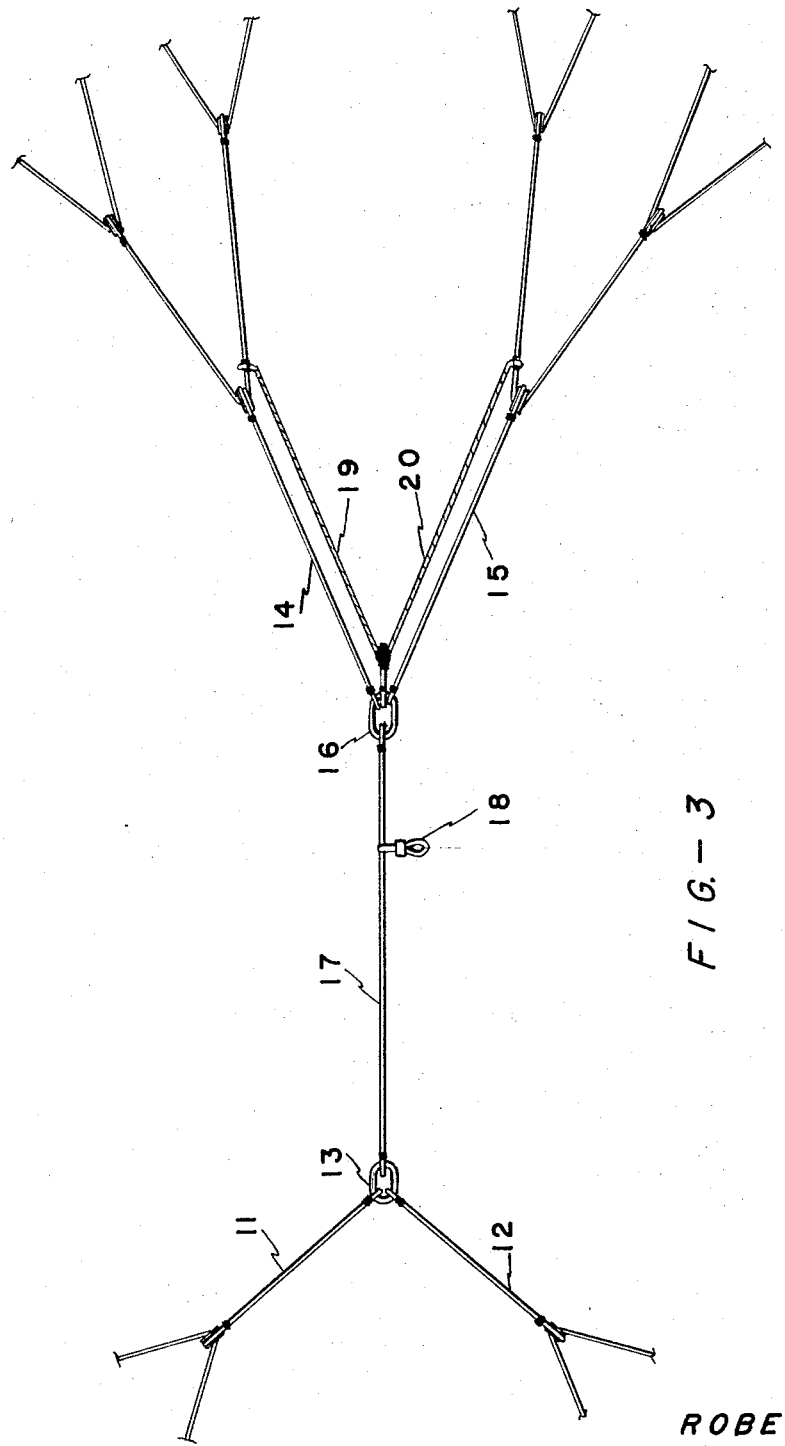

3,318,553
Patented May 9, 1967

3,318,553
ANGLE OF ATTACK COMPENSATING BRIDLE SYSTEM FOR LIGHTER-THAN-AIR BALLOON
Robert S. Ross, Northfield Center, Ohio, assignor to Goodyear Aerospace Corporation, Akron, Ohio, a corporation of Delaware
Filed Mar. 10, 1965, Ser. No. 438,508
3 Claims. (Cl. 244—33)

This invention relates to an angle of attack compensating bridle system for lighter-than-air balloons, and more particularly to an automatic means for preventing high bridle cable tensions and various angles of attack under large and variable wind loads.

Heretofore it has been known that there are many and varied types of bridle systems for lighter-than-air balloons and kites which are designed to vary, automatically, the angle of attack to compensate for the angle of the tether cable, or various wind loads. Most of these prior art systems work on a sliding pulley arrangement whereby the main tether cable is attached by a pulley to the bridle system to permit the bridle system to effectively slide relative to the tether cable to adjust the angle of attack automatically under variable wind conditions. However, these systems are subject to wear and undesirable cable loading upon changed angles of attack because of the fixed length of the bridle system itself.

Therefore, it is the general object of the present invention to avoid and overcome the foregoing and other difficulties of and objections to prior art practices by the provisions of a bridle system incorporating elastic arms in such a manner that an increase in load on the tether cable will automatically adjust the balloon angle of attack thereby resulting in a minimum tether cable load.

A further object of the invention is to provide a bridle system which includes an elastic stretchable means in the rearward members of the bridle system arranged such that the balloon angle of attack is automatically compensated by stretching the rearward members of the bridle system to redistribute supporting loads to all cables in the bridle system and to thereby keep the main tether cable load at a minimum tension.

The aforesaid objects of the invention, and other objects which will become apparent as the description proceeds, are achieved in a bridle system for a lighter-than-air balloon which includes forward and after bridle members joined together at a point substantially below and centrally located with respect to the balloon, a tether cable joined to the point of connection of the forward and after bridle members, and stretchable means operatively associated with the rearward members of the bridle system to normally provide slack in the rearward bridle systems so that said means stretches under variable wind and load conditions to make the flight angle of attack of the balloon optimum for all wind conditions.

For a better understanding of the invention, reference should be had to the accompanying drawings wherein:

FIGURE 1 is a schematic illustration of the elastic bridling system of the invention shown with relation to a lighter-than-air balloon under very little or no wind conditions;

FIGURE 2 is a schematic illustration similar to FIGURE 1 where the balloon is subject to high wind conditions and the rearward elastic member has been stretched to its maximum limit to provide the desired flight angle of attack for the balloon; and FIGURE 3 is a broken away enlarged plan view of a specific bridle system which will achieve the objects of the invention.

While it should be understood that the bridle system of the invention is applicable to essentially any type of use where variable angles of the tethering cable will be inherent for any type of lighter-than-air balloon, the invention is normally employed with relation to a bridle system for a lighter-than-air elongated balloon, and hence it has been so illustrated and will be so described.

With reference to FIGURE 1 of the drawings, the numeral 1 indicates generally an elongated lighter-than-air balloon being tethered to the ground 2 by a tethering cable 3 affixed to a bridling system indicated generally by the numeral 4. It should be noted that the tether cable 3 is substantially vertically directed with respect to the ground 2, and that this would be the normal flight angle for the balloon 1 with no wind or very little as indicated by the arrow 5. The bridle system 4 is actually divided into a front cable network 6 and a rearward cable network 7. The rearward network 7 includes a stretchable elastic member 8 with a cable stop limiter 9 associated therewith. As is clearly shown in FIGURE 1 in a flight condition under no wind or very little wind, the stretchable member 8 is in a substantially non-extended position so there is a considerable slack in the cable stop limiter 9. It is this extendable member 8 in conjunction with the limiter or stop cable 9 which provides the desired objects of the invention, although it should be understood that the cable 9 is not an essential element, but is only provided for safety purposes to prevent the elastic member 8 from stretching too far.

The addition of the elastic member 8 prevents the extremely high cable loads caused by a high angle of attack on a balloon using fixed cable lengths. This system generally does not fully equalize the loads in the bridle system, but merely redistributes such loads to avoid overloading any cable of the bridle system.

More specifically, with reference to FIGURE 2, when the force of the wind increases as indicated by the arrows 10, the balloon 1 will tend to be driven downstream with respect to the tether point 3A. Thus, the change in the angle of the tether cable 3 relative to the balloon 1 automatically puts an increased strain on the rearward bridle system 7 causing a lengthening of the stretchable member 8, which in this instance is to its full extent thus being stopped by the cable stop limiter 9. In this manner, even though the tether cable 3 is attached in a fixed swivel position relative to the bridle system 4 at point 4A, the lengthening of the stretchable member 8 allows the balloon 1 to retain essentially the same angle of attack relative to the wind 10, which angle of attack gives the optimum flight conditions to the balloon 1.

If all the cables used in the bridle system 4 were of a fixed length, and an increase in wind velocity would then push the balloon downstream as indicated in FIGURE 2, this would create an increase in the angle of attack thereby resulting in high cable tensions. Therefore, it is desired to keep these tensions below a predetermined value throughout all the cables in the bridle system 4. The use of the stretchable elastic member 8 achieves this desired purpose. At all points in between the maximum extension of the stretchable member 8, as indicated in FIGURE 2, the stretchable or elastic qualities thereof will insure that the balloon is flying at the most optimum angle of attack to keep the cable load under a predetermined maximum.

With reference to FIGURE 3, a specific embodiment of a bridling system is illustrated. Particularly, a pair of forward bridle cables 11 and 12 are affixed to a connecting chain-link 13. Similarly, a pair of rearward bridle cables 14 and 15 connect to a similar chain-link 16. The chain-links 13 and 16 are connected together by a connecting cable 17. Normally, the invention contemplates that a tether cable may be operatively connected to the connecting cable 17 in a swiveled connecting relationship, such as at 18. In order to achieve the desired objects of the bridling system, a pair of stretchable resilient elastic members 19 and 20 are operatively connected together at one end to the chain-link 16 and at the other end to their respective rearward bridle systems 14 and 15. In FIGURE 3, the normally slack relationship of the cables 14 and 15, as compared with the stretchable members 19 and 20 in the unstretched condition, is not visible because of the plan view of this illustration. However, it should be understood that with the stretchable members 19 and 20 in the unstretched condition a considerable slack, such as the slack 9, indicated in FIGURE 1, will be the normal relationship.

Although FIGURE 3 illustrates the use of fixed grommets, the invention also contemplates a bridle system usually associated with larger craft using pulleys to equalize loading, or to any other system of load fastening, rigid or equalizing.

Thus, it is seen that the objects of the invention have been achieved by providing a bridle system for a lighter-than-air balloon which utilizes an elastic stretchable member in the rearward bridle member of the bridle system arranged in such a way that under no wind load the balloon will stand substantially directly over the tether point and at a small angle of attack with respect to a horizontal reference. As soon as the wind starts to blow and thus moves the balloon downstream, the elastic stretchable member will stretch thus providing the balloon with the optimum angle of attack for optimum flight conditions, and insuring that substantially smaller tension loads will be resultant on all cables of the bridling system thereby keeping cable loads under predetermined maximums.

It is anticipated that the elastic stretchable members 19 and 20 of FIGURE 3 and the stretchable member 8 of FIGURES 1 and 2 could be made from a system such as bungees or springs, or a suitable resiliently stretchable composition. Further, although it is anticipated that the optimum results of the stretchable member will be most beneficial when applied to the rearward bridling system, it should be understood that such stretchable means might also be applied to the forward bridling system to obtain certain desired results, or both forward and rearward systems could have stretchable means associated therewith. Also, of course, the limiter or stop cable is not necessary except for safety purposes.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In a suspension tethering system for a lighter-than-air balloon, the combination of
 a bridle system connecting to the forward and the rearward portions of the balloon,
 a tether cable operatively connected in swivel relation to the bridle system near the middle thereof,
 a pair of stretchable resilient elastic members associated with the bridle system and each connected at one end thereof to the tether cable and at the other end to respective rearward portions of the bridle system whereby each of such members elongate the bridle system between the rearward portions of the balloon and the tether cable upon an increase of tether cable loads to thereby equalize cable tensions in the bridle system, and
 separate limit cable means associated with each of the pair of elastic members and connected at their ends in the same manner as the elastic members to limit the maximum stretchable length of the elastic members, and act as permanent support cables of the bridal system.

2. A suspension tethering system according to claim 1 and including a pair of stretchable resilient elastic members connected at one end to the tether cable and at the other end to respective forward portions of the bridle system to allow elongation of the bridle system between the forward portions of the balloon and the tether cable.

3. In a suspension tethering system for a lighter-than-air balloon the combination of
 a forward bridle cable means connecting to spaced forward portions of the balloon,
 a rearward bridle cable means connecting to spaced rearward portions of the balloon,
 connecting cable means connecting the forward cable means to the rearward cable means in spaced relation substantially uniform centrally beneath the balloon,
 tether cable means operatively connected in swivel relation to the connecting cable means,
 a pair of stretchable means operatively connected at one of their ends near the rearward portion of the balloon to respective portions of the rearward bridle cable means and at their other ends to the connecting cable means to normally provide slack in the rearward cable means so that said stretchable means elongates in an elastic manner under variable wind and load conditions to insure that the flight angle of attack will be optimum and that tensions on the forward and rearward bridle cable means will be substantially reduced; and
 limit cable means associated with each of said pair of stretchable means and connected to opposite ends thereof to limit the maximum stretchable length of the elastic members.

References Cited by the Examiner

UNITED STATES PATENTS

| 96,550 | 11/1869 | Clark | 244—153 |
|---|---|---|---|
| 2,398,744 | 4/1946 | Jalbert | 244—33 |

FERGUS S. MIDDLETON, *Primary Examiner.*

T. MAJOR, *Assistant Examiner.*